United States Patent [19]

Marx et al.

[11] Patent Number: 4,656,201

[45] Date of Patent: Apr. 7, 1987

[54] S-TRIAZINE-RADICAL-CONTAINING POLYETHER POLYOL MIXTURES, PROCESS FOR THEIR PREPARATION AND THEIR USE

[75] Inventors: Matthias Marx, Bad Durkheim; Joachim Jaehme, Ludwigshafen, both of Fed. Rep. of Germany

[73] Assignee: BASF Aktiengesellschaft, Ludwigshafen, Fed. Rep. of Germany

[21] Appl. No.: 715,351

[22] Filed: Mar. 25, 1985

[30] Foreign Application Priority Data

Mar. 31, 1984 [DE] Fed. Rep. of Germany ....... 3412082

[51] Int. Cl.$^4$ ..................... C08G 18/14; C08G 18/50
[52] U.S. Cl. ................................. 521/166; 252/182; 521/167; 521/902; 528/73
[58] Field of Search ..................... 521/166, 164, 167; 528/73; 252/182

[56] References Cited

U.S. PATENT DOCUMENTS

| | | | |
|---|---|---|---|
| 3,328,321 | 6/1967 | Wismer et al. | 521/167 |
| 3,438,986 | 4/1969 | Kaiser et al. | 521/164 |
| 3,812,122 | 5/1974 | Lengsfeld | 521/167 |

FOREIGN PATENT DOCUMENTS 1064148  4/1967  United Kingdom .

*Primary Examiner*—Herbert S. Cockeram
*Attorney, Agent, or Firm*—William G. Conger

[57] ABSTRACT

The invention relates to s-triazine radical-containing polyether polyol mixtures having functionalities of from 2 to 6 and hydroxyl numbers of from 210 to 640, prepared by the oxyalkylation of a mixture of one or more polyamino-1,3,5-triazines, preferably melamine, and an alkanol having a hydroxyl functionality of from 2 to 6 and having 2 to 18 carbon atoms, water, or their mixtures, in the absence of catalysts and conventional inert polar solvents. The resulting polyether polyol mixtures are suitable for the preparation of rigid polyurethane, polyisocyanurate, and urethane group-containing polyisocyanuate foams produced by means of the polyisocyanate polyaddition process.

13 Claims, No Drawings

4,656,201

S-TRIAZINE-RADICAL-CONTAINING POLYETHER POLYOL MIXTURES, PROCESS FOR THEIR PREPARATION AND THEIR USE

BACKGROUND OF THE INVENTION

1. Field of the Invention

The subject invention relates to a process for preparing s-triazine radical containing polyether polyols. More particularly, the subject invention relates to a process for preparing such polyether polyols by oxyalkylating one or more polyamino-1,3,5-triazines and optionally an alkanol, water, or both alkanol and water, in the absence of both catalysts and inert polar solvents. The polyether polyols are especially suited for the preparation of rigid polyurethane, polyisocyanurate, and urethane group-containing polyisocyanurate foams.

2. Description of the Related Art

The preparation of oxyalkylated polyamino-1,3,5-triazines is described in Federal Republic of Germany OS 21 18 868 (U.S. Pat. No. 3,812,122). In this process, polyamino-1,3,5-triazines are oxyalkylated with alkylene oxides in the presence of basic catalysts in N,N-dialkylcarboxamide solvents at temperatures of from 90° C. to 200° C.

Polyhydroxyalkylamino-s-triazines may be prepared in accordance with U.S. Pat. No. 3,328,321 by reacting amino-s-triazines such as melamine with ethylene carbonate or alkylene oxides in the presence of basic catalysts and solvents such as diethylene glycol dimethyl ether and dimethylformamide. These polyhydroxyalkylamino-s-triazines have hydroxyl numbers of from 150 to 450 and may be used alone, or mixed with conventionally used higher molecular weight compounds containing reactive hydrogen atoms, such as polyether polyols, polyester polyols, and polyamides, in the preparation of cellular polyurethanes.

Oxyalkylated polyamino-1,3,5-triazines may be prepared in accordance with U.S. Pat. No. 3,438,986 wherein oxyalkylated aryl diamines are used as solvents. The resulting mixtures of oxyalkylated aryl diamines, oxyalkylated triazines, and oxyalkylated organic hydroxyl compounds are also suitable for preparing polyurethane foams.

As described in British Pat. No. 1,064,148, mixture of amino-1,3,5-triazines and aliphatic or aromatic, saturated or unsaturated polyols may be oxyalkylated in the presence of basic catalysts at temperatures of from 75° C. to 175° C. As described in the specification, the use of inert solvents can sometimes be eliminated in the oxyalkylation process. However, when melamine and other aminotriazines having low-solubility and relatively high melting points are used as one of the co-initiators, it is recommended that dimethylsulfoxide solvent also be used.

The foregoing procedures have a disadvantage in that the oxyalkylation of the polyamino-1,3,5-triazines must always be performed in the presence of basic catalysts, for example alkali metal hydroxides or alkoxides, and that oxyalkylated aryldiamines or inert polar solvents such as dimethylformamide or dimethylsulfoxide must be used. Since the process expenses for separating both the high-boiling-point polar solvents and the catalysts are considerable, the oxyalkylated aminotriazine-containing polyether polyol product mixtures so far have not established themselves commercially as basic components for preparing polyurethanes.

SUMMARY OF THE INVENTION

The object of the invention is a commercially feasible process for the oxyalkylation of a polyamino-1,3,5-triazine, or of a mixture of a polyamino-1,3,5-triazine and a polyhydroxyl compound, which does not suffer from the disadvantages cited above. It is particularly important to avoid, as nearly as possible, the use of additives and/or auxiliaries which would be difficult and therefore expensive to remove, so that the resulting polyether polyol mixtures can be processed directly into polyurethanes without the need for additional purification steps. In addition, it is a further object of the invention that the oxyalkylation be performed under moderate reaction conditions in order to suppress the formation of by-products such as amines or alcohols which otherwise might result in unpleasant odors or cause difficulties in further processing into polyurethanes.

Accordingly, it has been unexpectedly discovered that mixtures of polyamino-1,3,5-triazines, alkanols and/or water can be oxyalkylated without using catalysts or the solvents previously described, in particular dimethylformamide and dimethylsulfoxide.

Thus, the invention relates to s-triazine-radical-containing polyether polyol mixtures having a hydroxyl functionality of from 2 to 6, preferably from 2.5 to 5, and hydroxyl numbers of from 210 to 640, preferably from 270 to 560, prepared by the solvent-free and catalyst-free oxyalkylation of a mixture of one or more polyamino-1,3,5-triazines and one or more active hydrogen-containing compounds selected from the group consisting of aliphatic and cycloaliphatic alkanols having functionalities of from 2 to 6 and containing from 2 to 18 carbon atoms, and water.

As a result of using the process of the subject invention, the oxyalkylation of difficultly soluble polyamino-1,3,5-triazines in admixture with water or the alcohols cited above, produces liquid, highly oxyalkylated polyether polyol mixtures, oxyalkylation of the polyamino-1,3,5-triazine taking place at an enhanced rate relative to the other reactive hydrogen-containing compounds. In contrast, the conventional, catalyzed process results in polyols which are conventionally used in the form of a suspension having a relatively high solids content.

Because the oxyalkylation is performed in the absence of catalysts and solvents, the s-triazine radical containing polyether polyol mixtures that are obtained can be processed directly into plastics using polyisocyanate polyaddition processes without the need for further purification operations.

DESCRIPTION OF THE PREFERRED EMBODIMENTS

All polyamino-1,3,5-triazines containing at least two amino groups are suitable for the preparation of the s-triazine radical-containing polyether polyol mixtures of the subject invention. Typical examples are polyamino-1,3,5-triazines which may optionally be substituted with aliphatic, cycloaliphatic, or aromatic radicals containing from 1 to 18 carbon atoms. Examples of suitable polyamino-1,3,5-triazines are 6-methyl-, 6-ethyl-, 6-n-propyl-, 6-isopropyl-, 6-butyl-, 6-hexyl-, 6-stearyl-, 6-butenyl-, 6-cyclohexyl-, 6-phenyl-, 6-dimethylamino-, and 2,4-diamino-1,3,5-triazines. Preferably, hard-to-dissolve and high melting point polyamino-1,3,5-triazines are used, for example 6-phenyl-2,4-diamino-1,3,5-triazine. Melamine is especially preferred. The polyamino- 1,3,5-triazines can be used individually or in the form of mixtures.

In the process of the subject invention, the polyamino-1,3,5-triazines are oxyalkylated in admixture with water and/or one or more cycloaliphatic or preferably aliphatic alkanols having functionalities of from 2 to 6, preferably from 2 to 4, and preferably having from 2 to 6 carbon atoms. Typical alkanols which have proven successful are aliphatic or cycloaliphatic diols such as ethanediol 1,2-propanediol, 1,3-propanediol, 1,4-butanediol, 1,5-pentanediol, 1,6-hexanediol, 1,10-decanediol, 1,12-dodecane-diol, 1,2-, 1,3-, 1,4-cyclohexanediols, diethylene glycol, dipropylene glycol, oligomeric polyoxyethylene glycols, polyoxypropylene glycols, and polyoxyethylene-polyoxypropylene glycols having molecular weights of up to 500; triols such as trimethylolalkanes, for example trimethylolethane, trimethylolpropane, and trimethylolbutane, glycerin, 1,2,3-, 1,2,4- and 1,3,5-trihydroxycyclohexanes, higher functionality alkanols such as pentaerythritol, and sugar alcohols such as sorbitol. The alkanols having a functionality of from 2 to 6 can be used individually or in the form of mixtures. Preferably used are ethanediol, 1,3-propanediol, diethylene glycol, dipropylene glycol, 1,4-butanediol, 1,5-pentanediol, 1,6-hexanediol, glycerin, trimethylolpropane, pentaerythritol, sorbitol and mixtures of two or more of these.

Water may also be used as an initiator in combination with the polyamino-1,3,5-triazines. Suitable initiator mixtures can also be prepared from polyamino-1,3,5-triazines, alkanols having a functionality of from 2 to 6, and water. Mixtures of melamine and alcohols having functionalities of from 2 to 3, and containing 2 to 6 carbon atoms have proven to be particularly effective and are therefore preferably used as the initiators.

The mixtures used as initiators contain from 80 to 320 parts by weight of water and/or one or more aliphatic or cycloaliphatic alkanols having functionalities of from 2 to 6 and containing from 2 to 18 carbon atoms, per 100 parts by weight polyamino-1,3,5-triazine. Conventional alkylene oxides containing from 2 to 4 carbon atoms in the alkylene radical are suitable for the oxyalkylation. Typical examples are 1,2- and 2,3-butylene oxide, styrene oxide, epichlorohydrin, ethylene oxide, 1,2-propylene oxide and their mixtures. Ethylene oxide, mixtures of ethylene oxide and 1,2-propylene oxide, and preferably 1,2-propylene oxide are used. The alkylene oxides are used in amounts varying according to the functionality of the initiator mixture, such that the resulting s-triazine radical-containing polyether polyol mixtures possess hydroxyl numbers of from 210 to 640.

In order to produce the s-triazine radical-containing polyether polyol mixtures of the invention, the polyamino-1,3,5-triazines are mixed in the amounts cited above with water and/or the aliphatic or cycloaliphatic alkanols and the resulting mixture, which is generally a suspension, is oxyalkylated at temperatures from 90° C. to 180° C., preferably from 130° C. to 150° C., at a pressure of from 1 to 10 bar, preferably from 3 to 7 bar, in the absence of solvents and catalysts. The alkylene oxide or alkylene oxide mixture is incorporated into the reaction mixture, optionally diluted with an inert gas such as nitrogen, at such rates that it reacts in 0.5 to 24 hours. If inert gases are used as diluents, the amount of inert gas used is such that the partial pressure is from 0.01 to 3 bar, preferably from 1 to 2 bar. After the desired hydroxyl number of from 210 to 640 has been reached, the addition of the alkylene oxide is terminated, the pressure in the reaction vessel is released, and excess alkylene oxide and any high-volatility by-products are separated, for example by distilling at reduced pressure. The distillation residue, which comprises the polyether polyol mixture of the invention, can also be filtered if desired.

Depending on their functionality and hydroxyl number, the s-triazine radical-containing polyether polyol mixtures of the invention possess viscosities of from 500 to 8000 m.Pas at 25° C. Highly viscous products may be diluted to improve handling for specific applications, for example in preparing polymers using polyisocyanate polyaddition processes. Dilution may be accomplished by adding suitable polyols, for example conventional polyether and polyester polyols, polyester amides, hydroxyl group-containing polyacetals, etc. Low molecular weight chain extenders such as diols and cross-linking agents such as triols, tetrols, or polyamines may also be utilized for specific applications.

The products of the process of the subject invention are suitable for the preparation of polymers using polyisocyanate polyaddition processes. Preferably, they are utilized in the preparation of rigid polyurethane foams, rigid polyisocyanurate foams, or rigid urethane group-containing polyisocyanuate foams.

Solvent-free s-triazine radical-containing polyether polyol mixtures having hydroxyl numbers less than 210, for example those having hydroxyl numbers down to 20, preferably from 26 to approximately 200, can also be prepared by the process of the subject invention. To do this, a two-step procedure is utilized, wherein the first step is uncatalyzed as previously described, and a suitable oxyalkylation catalyst is added prior to the second step. For example, basic catalysts may be incorporated into the polyether polyol mixtures prepared by the process of the invention which have functionalities of from 2 to 6 and hydroxyl numbers of from 210 to 640. Following catalyst addition, the oxyalkylation is continued in the manner described above until the desired hydroxyl number is reached. The resulting reaction mixture is then treated using known methods. As basic catalysts, it is preferable to use alkali metal hydroxides such as sodium hydroxide or, preferably, potassium hydroxide, or alkali metal alkoxides having from 1 to 4 carbon atoms in the alkoxy radical such as potassium methoxide, potassium propoxide, potassium isopropoxide, and, preferably, sodium methoxide, or sodium or potassium ethoxide in amounts of from 0.01 to 0.2 equivalents per mole of hydroxyl group. At the conclusion of the oxyalkylation, the basic catalysts are neutralized, for example with inorganic acid or acid salts, excess alkylene oxide and any volatile by-products are removed by distillation at reduced pressure, and the resulting reaction mixture is filtered.

The following examples will further illustrate the process of the invention.

EXAMPLE 1

A suspension of 126 g melamine and 400 g ethanediol was oxypropylated in a five-liter pressurized reactor having a temperature of 135° C. and a pressure of 5.0 bar over a period of seven hours using 800 g 1,2-propylene oxide. After an oxyalkylation time of approximately six hours, the melamine was completely dissolved. A quantitative yield of a polyether polyol mixture was obtained. The polyol had a functionality of 2.7, a hydroxyl number of 566, a viscosity of 720 m.Pas at 25° C., and a basic nitrogen content of 3.1 percent by weight. The tertiary nitrogen content was 2.8 percent by weight, the secondary nitrogen 0.2 percent by weight, and the primary nitrogen 0.1 percent by weight.

EXAMPLE 2

The same procedure was followed as in Example 1, however a suspension of 256 g melamine and 200 g water was used as the initiator mixture and a total of 1700 g 1,2-propylene oxide was added during oxyalkylation. The resulting polyether polyol mixture had a hydroxyl number of 630, a functionality of 2.7, a viscosity of 1100 m.Pas at 25° C., and a basic nitrogen content of 4.1 percent by weight with 4.0 percent by weight being tertiary nitrogen and 0.1 percent by weight being primary or secondary nitrogen.

EXAMPLE 3

The same procedure was followed as in Example 1, however a suspension of 259 g melamine, 235 g glycerin and 2550 g 1,2-propylene oxide were used as starting components. A polyether polyol mixture was obtained having a functionality of 4.3, a hydroxyl number of 420, a viscosity of 2050 m.Pas at 25° C., and a basic nitrogen content of 2.6 percent by weight, of which 2.3 percent by weight was tertiary nitrogen, 0.2 percent by weight was secondary, and 0.1 percent by weight was primary.

EXAMPLE 4

Using the reaction conditions described in Example 1, a suspension of 252 g melamine and 300 g ethanediol and 1600 g 1,2-propylene oxide resulted in a polyether polyol mixture having a functionality of 3.2, a hydroxyl number of 607, a viscosity of 607 m.Pas at 25° C. and a basic nitrogen content of 3.3 percent by weight, with 3.0 percent by weight present as tertiary nitrogen.

EXAMPLE 5

A suspension of 259 g melamine and 235 g glycerin was oxyethylated in a five-liter pressurized reactor at temperatures of 140° C. and a pressure ranging from 4 to 6 bar, over a period of seven hours using 3650 g ethylene oxide. A clear, brown polyether polyol mixture was obtained, having a functionality of 4.3, a hydroxyl number of 285, a viscosity of 850 m.Pas at 25° C. and a basic nitrogen content of 1.2 percent by weight, with 1.1 percent by weight present as tertiary nitrogen.

EXAMPLE 6

The procedure was used as in Example 5, however a suspension of 300 g melamine, 100 g glycerin, and 100 g ethanediol was used with 2650 g 1,2-propylene oxide. A clear polyether polyol mixture was obtained having a functionality of 4.1, a hydroxyl number of 377, a viscosity of 1450 m.Pas at 25° C., and a basic nitrogen content of 2.8 percent by weight, with 2.4 percent by weight present as tertiary nitrogen.

EXAMPLE 7

A suspension of 70 g melamine and 200 g melted sorbitol were oxypropylated at 130° C. at a pressure of 5.0 bar over a period of six hours using 800 g 1,2-propylene oxide. A clear, yellow polyether polyol mixture was obtained having a functionality of 6.0, a hydroxyl number of 545, a viscosity of 6890 m.Pas at 25° C., and a basic nitrogen content of 2.3 percent by weight, with 2.0 percent by weight present as tertiary nitrogen.

COMPARISON EXAMPLE A

A suspension of 252 g melamine in 300 g ethanediol was reacted with 1600 g 1,2-propylene oxide in the presence of 2.5 g of an 85 percent by weight aqueous potassium hydroxide solution at 130° C. at a pressure of 5.0 bar. After six hours the 1,2-propylene oxide had reacted completely. A turbid suspension was produced from which solid melamine was filtered off.

COMPARISON EXAMPLE B

A suspension of 259 g melamine and 235 g glycerin was reacted in the presence of 3.7 g of an 85 percent by weight aqueous potassium hydroxide solution in a manner similar to that used in Comparison Example A using 2550 g 1,2-propylene oxide. After seven hours the propylene oxide was completely reacted. A turbid suspension was produced and the entire charge of melamine was separated in unaltered form, by means of filtration.

COMPARISON EXAMPLE C

A suspension of 259 g melamine and 235 g glycerin was reacted with 2550 g 1,2-propylene oxide in the presence of 6.1 g pentamethyldiethylenetriamine as the catalyst at a pressure of 5.0 bar. After a reaction time of 15 hours at 135° C. and five hours at 150° C., the pressure held constant; propylene oxide was no longer being polymerized. After the pressure was released, 700 g propylene oxide was reclaimed. Melamine was filtered from the cloudy suspension in unchanged form.

The embodiments of the invention in which an exclusive privilege or property is claimed are defined as follows:

1. An s-triazine-radical-containing polyether polyol mixture having a functionality of from 2 to 6 and a hydroxyl number of from 210 to 640, prepared by the process of oxyalkylating a solvent-free initiator selected from the group consisting of polyamino-1,3,5-triazines, and polyamino-1,3,5-triazines in admixture with a co-initiator selected from the group consisting of
   (a) aliphatic and cycloaliphatic alkanols containing from 2 to 18 carbon atoms and having a hydroxyl functionality of from 2 to 6,
   (b) water, and
   (c) mixtures of (a) and (b), wherein said oxyalkylation is performed in the absence of catalysts and inert polar solvents.

2. The s-triazine-radical-containing polyether polyol composition of claim 1 wherein from 80 to 320 parts by weight of said alkanol, water or their mixtures are used per 100 parts by weight of polyamino-1,3,5-triazine.

3. The s-triazine-radical-containing polyether polyol composition of claim 1 wherein melamine is used as the polyamino-1,3,5-triazine.

4. The s-triazine-radical-containing polyether polyol composition of claim 1 wherein ethanediol, 1,3-propanediol, diethylene glycol, dipropylene glycol, 1,4-butanediol, 1,5-pentanediol, 1,6-hexanediol, glycerin, trimethylolpropane, pentaerythritol, sorbitol, or their mixtures are used as the alkanol.

5. The s-triazine-radical-containing polyether polyol composition of claim 1 wherein said alkylene oxide is selected from the group consisting of ethylene oxide, 1,2-propylene oxide, and mixtures of ethylene oxide and propylene oxide.

6. A process for the preparation of s-triazine-radical-containing polyether polyol compositions by the addition polymerization of alkylene oxides onto a solvent-free initiator mixture comprising oxyalkylating an initiator selected from the group consisting of polyamino-1,3,5-triazines, and polyamino-1,3,5-triazines in admixture with a co-initiator selected from the group consisting of
  (a) aliphatic and cycloaliphatic alkanols containing from 2 to 18 carbon atoms and having a hydroxyl functionality of from 2 to 6,
  (b) water, and
  (c) mixtures of (a) and (b), wherein said oxyalkylation is performed in the absence of catalysts and inert polar solvents and wherein the resulting polyether polyol mixture has a hydroxyl number of from 210 to 640 and a functionality of from 2 to 6.

7. The process of claim 6 wherein 80 to 320 parts by weight of said alkanol, water, or their mixtures are used per 100 parts by weight polyamino-1,3,5-triazine.

8. The process of claim 6 wherein melamine is used as the polyamino-1,3,5-triazine.

9. An s-triazine radical-containing polyether polyol having a hydroxyl number of from 20 to 200 prepared by the steps of
  (i) oxyalkylating a solvent-free initiator selected from the group consiting of polyamino-1,3,5-triazines and polyamino-1,3,5-triazines in admixture with a co-initiator selected from the group consisting of (a) aliphatic and cycloaliphatic alkanols containing from 2 to 18 carbon atoms and having a hydroxyl functionality of from 2 to 6, (b) water and (c) mixtures of (a) and (b), in the absence of catalysts and inert polar solvents, wherein the product has a hydroxyl number of from 210 to 640,
  (ii) thereafter adding an alkaline catalyst selected from the group consisting of alkali metal hydroxides and alkali metal alkoxides to the s-triazine-radical-containing polyether polyol, of step (i) and
  (iii) further oxyalkylating the 210 to 640 hydroxyl number s-triazine-radical-containing polyether polyol mixture until a hydroxyl number of from 20 to 200 is achieved.

10. The s-triazine polyether polyol of claim 9 wherein the oxyalkylation performed in steps (i) and (ii) is accomplished by the use the same or a different mixture of one or more alkylene oxides selected from the group consisting of ethylene oxide, propylene oxide, and butylene oxide.

11. In a polymer formed by the polyisocyanate polyaddition process wherein polyisocyanates are reacted with active hydrogen containing compounds selected from polyols, chain extenders, and cross-linking agents, in the presence of suitable catalysts, blowing agents, auxiliaries and additives, the improvement comprising employing as a polyol component, the composition of claim 1.

12. The polymer of claim 11 wherein said polymer is selected from the group consisting of polyurethanes, polyisocyanurates, and urethane group-containing polyisocyanurates.

13. The polymer of claim 11 wherein said polymer is selected from the group consisting of rigid polyurethane foams, rigid polyisocyanurate foams, and rigid urethane group-containing polyisocyanurate foams.

* * * * *